United States Patent [19]

Sharpe et al.

[11] Patent Number: 4,768,032
[45] Date of Patent: Aug. 30, 1988

[54] PAGER DECODING SYSTEM

[75] Inventors: Anthony K. Sharpe, Teversham; Andrew D. McPherson, Cambridge, both of England

[73] Assignee: U.S. Philips Corp., New York, N.Y.

[21] Appl. No.: 29,361

[22] Filed: Mar. 23, 1987

Related U.S. Application Data

[63] Continuation of Ser. No. 816,671, Dec. 30, 1985, abandoned, which is a continuation of Ser. No. 582,423, Feb. 22, 1984, abandoned.

[30] Foreign Application Priority Data

Feb. 25, 1983 [GB] United Kingdom ............... 8305294

[51] Int. Cl.$^4$ ............................................. H04Q 1/00
[52] U.S. Cl. ........................... 340/825.47; 340/825.48
[58] Field of Search ........... 340/311.1, 825.44, 825.47, 340/825.48; 455/31, 34, 38, 343

[56] References Cited

U.S. PATENT DOCUMENTS

| | | | |
|---|---|---|---|
| 4,181,893 | 1/1980 | Ehmke | 340/311.1 |
| 4,194,153 | 3/1980 | Masaki et al. | 455/31 |
| 4,353,065 | 10/1982 | Mori | 340/825.44 |
| 4,369,443 | 1/1983 | Giallanza et al. | 455/38 X |
| 4,392,135 | 7/1983 | Ohyagi | 340/825.46 X |
| 4,398,192 | 8/1983 | Moore et al. | 340/825.44 |
| 4,403,212 | 9/1983 | Masaki | 179/2 EC X |
| 4,424,514 | 1/1984 | Fennell et al. | 179/2 EC X |
| 4,437,095 | 3/1984 | Akahori et al. | 455/38 X |

FOREIGN PATENT DOCUMENTS 1038517 8/1966 United Kingdom .
2086106 5/1982 United Kingdom .

Primary Examiner—Ulysses Weldon
Attorney, Agent, or Firm—David R. Treacy

[57] ABSTRACT

A pager decoding system which is suitable for use with signal formats, such as POCSAG, in which code words are sent in batches, each batch containing a synchronization code word and (n−1) address/message code words, n being the number of code words in a batch, each code word comprising m bits.

The pager is able to detect or regain synchronization code word when the carrier signal is lost due to fading.

When synchronization is lost input data received by the pager is combed through by switching-on the pager for a duration of m bits at intervals corresponding to (n+1) code words. The data received is stored in a shift register having m stages and in which a synchronization code word can be assembled within two batch periods. Once the synchronization code word has been detected the pager can be switched to a normal data receive mode.

In another fade recovery mode the (m−1)th, mth, and (m+1)th bit positions every nth code word are searched to see if a preamble or synchronization code word is present. If none is detected after a predetermined number of batches has been searched then the pager assumes the loss of synchronization mode described above.

3 Claims, 2 Drawing Sheets

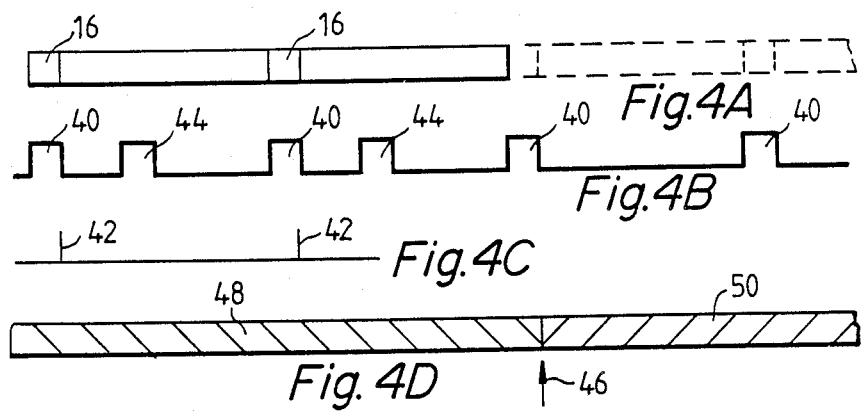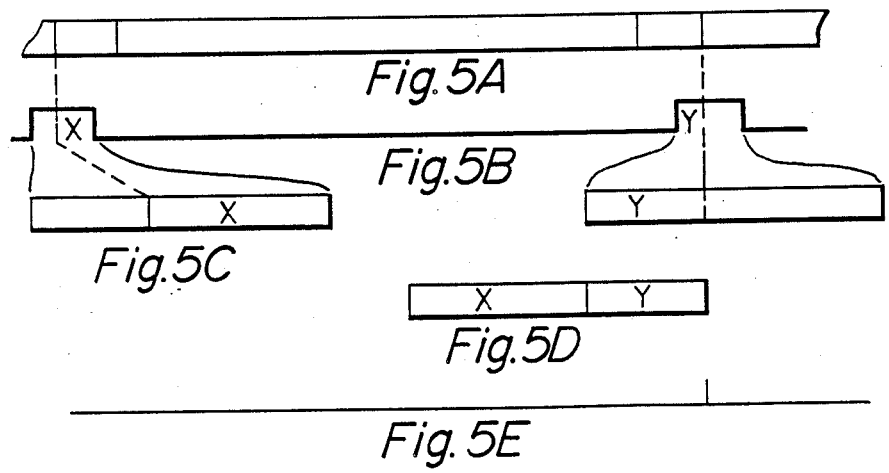

PAGER DECODING SYSTEM

This is a continuation of application Ser. No. 816,671, filed Dec. 30, 1985, now abandoned, which is a continuation of application Ser. No. 582,423, filed Feb. 22, 1984, now abandoned.

FIELD OF THE INVENTION

The present invention relates to a pager decoding system for use in a paging system employing a standard code such as the CCIR Radiopaging Code No. 1, otherwise known as POCSAG (British Post Office Code Standardisation Advisory Group). This particular code is summarized in the document "A Standard Code for Radio Paging" published by the British Post Office in June 1978.

BACKGROUND OF THE INVENTION

Although the POCSAG code is becoming widely known, in order to understand the present invention it is worth mentioning the signal and code word formats of POCSAG and in this respect reference is made to FIGS. 1 and 2 of the accompanying drawings. FIG. 1 shows the signal format which comprises a preamble 10 of at least 576 bits, comprising alternate ones and zeroes, and a series of batches 12, 14, each of 544 bits. The preamble 10 at its shortest duration has a number of bits corresponding to one of the batches plus a 32-bit code word. A batch 12 or 14 comprises a 32-bit synchronisation code word 16 and eight frames 18, each frame comprising two code words 20, each 32 bits in length. Thus each batch 12, 14 is formed by seventeen code words 20, each 32 bits long.

As described above, the POCSAG format is representative of one in which a batch consists of n words; a word consists of m bits; and the preamble has a length equal to at least n+1 words; that is, the preamble is at least m (n+1) bits. Thus in the POCSAG format n=17, m=32, and the preamble is at least 32 (17+1)=576 bits long.

There are two types of code words 20: address code words 22 and message code words 24. The first bit of a code word determines whether it is an address code word or a message code word, depending on whether its value is zero or one. In the case of an address code word, bits 2 to 19 are address bits corresponding to the eighteen most significant bits of a 21-bit identity code assigned to the paging receiver. The three least significant bits are not transmitted but serve to define the frame within a batch in which the address code word must be transmitted. Four discrete addresses are assigned to each paging receiver having a given 21-bit identity code, selection of a particular one of the four addresses depending on the values assigned to the bits 20 and 21. Bits 22 to 31 are cyclic redundancy check bits and the final bit, bit 32, is chosen to give even parity on the complete code word.

In the case of a message code word 24, the bits 2 to 21 are assigned as message bits which do not follow the allocations of the address code word 22, whereas bits 22 to 32 do.

A batch is formed by a synchronisation code word which precedes in time sixteen other code words. Since the identity of a paging receiver is defined by an address code word 22 transmitted in a given time frame 18 within a batch 12, 14, it is unnecessary for the paging receiver to receive any address code words other than those in its allocated frame. Thus the paging receiver may switch off when other frames are being transmitted, thus providing a battery saving capability. In any transmission of a batch, an idle (unallocated) address code word is transmitted in the event that a particular code word location within that batch is not required for the transmission of a paging call.

A paging call requiring transmission of message code words 24 is formatted such that an appropriate number of message code words 24, related to the length of the message, are concatenated onto one of the address code words 22 assigned to the particular paging receiver. Although message code words 24 (FIG. 2) may continue into a subsequent batch due to the length of the messages, the normal batch structure, that is, sixteen code words 20 preceded by a synchronisation code word 16, is maintained.

With the POCSAG signalling structure, a paging decoder has to synchronize itself first with the preamble 10 and second with the synchronisation code word 16. Unless the paging decoder is synchronised to the synchronisation code word, it will be unable to decode successfully address code words in their assigned frame.

In operation, a paging receiver inits carrier-off mode, i.e. when there are no transmissions from its base station, is usually switched on once every seventeen code words for a duration equal to that of a 32-bit code word in order to detect the preamble bit pattern which may be transmitted. Since the preamble for POCSAG is at least eighteen code words long it will quickly be detected. Thereafter the paging receiver is continuously energised for a duration of eighteen code words in order to detect the synchronisation code word 16 which is concatenated onto the preamble 10. Then the paging receiver assumes its data receive mode and switches its receiver section off until its assigned time frame and then switches it on for that time frame in order to decoder address code words. Then the decoder will be switched off until the time slot allocated to the synchronisation code word in a subsequent concatenated batch, at which time the decoder is switched on in order to decode that synchronisation code word and subsequently the address code word in the following allocated frame. If the synchronisation code word is not detected, then the paging decoder may not decode address code words in the allocated subsequent time frame. Thus it is essential to achieve and maintain word synchronisation. It is important that synchronisation and address code words be decoded acceptably in order to keep a sufficiently low falsing rate.

British Patent Specification No. 2,086,106A discloses a pager decoding circuit with an intelligent synchronisation circuit. This known circuit employs a synchronisation strategy which tolerates at least some degree of error in an attempt to achieve batch synchronisation. The decoding circuit includes means for examining the received bit pattern in order to search initially for the presence of the preamble. When a match or near match to the preamble bit pattern is detected, the decoding circuit examines the received bit pattern for the synchronisation code word. When a match or a near match to the synchronisation code word is achieved, the decoding circuit is deemed to be in batch synchronisation, in which case it is then able to examine the address code words in the assigned frame in order to detect the receipt of a paging call.

The decoding circuit then examines each synchronisation time slot in subsequent batches in order to detect the synchronisation code word in those batches and thereafter detect address code words in the allocated time frame within those batches. If neither a match between the received bit pattern and the stored reference synchronisation code word is achieved nor a near match to a certain number of bits in error is obtained, then the address frame is not examined for address code words. If the synchronisation code word is again not detected in the time slot allocated for the synchronisation code word in the next batch, assuming that a next batch has been transmitted, then the decoding circuit deems that batch synchronisation has been lost and then reverts to its carrier-off mode, in which it examines the received bit pattern for the preamble bit pattern or a near match to it.

When examining the received bit pattern for the presence of the preamble, the known circuit switches on for one code word slot in each batch, as before, thus guaranteeing detection of the preamble if it is being transmitted. Once the preamble has been detected, the receiver examines the bit pattern for the synchronisation code word. When this has been detected, the known circuit assumes a data receive mode as described previously.

This known decoding circuit has two drawbacks. First, it cannot resume correct batch synchronisation if a long fade, i.e. greater than eighteen code words (worst case), occurs, causing irrecoverable errors in the received bit pattern because the circuit will have reverted to preamble detection operation in a carrier-off mode while coded data is still being transmitted. Consequently the probability of detecting the preamble in the coded data is very low, causing batches of data (e.g. addresses) to be overlooked. The second drawback in the operation of this known decoding circuit may occur if the paging receiver is used in a heavily loaded, zoned transmission system. A zoned transmission system as specified within the POCSAG description would allow for the transmission of a preamble immediately concatenated to the end of a batch of code words if the paging receiver were in an overlap region of two transmission zones and the data transmission period in the first zone were continuous for the complete zone time period. Under such circumstances the known circuit would not detect the transmitted preamble (assuming that the received bit pattern is decodable as preamble) since immediately following failure to detect a synchronisation code word, as would occur at the end of transmission on one zone or in an unzoned system, the known decoder will be examining only the received bit pattern for the following synchronisation code word, which will not be present because preamble is being transmitted.

SUMMARY OF THE INVENTION

It is the object of the present invention to recover and maintain batch synchronisation more effectively than is possible in the prior art system.

According to the present invention a pager decoding system, suitable for use with a signal format in which code words of m bits are sent in batches of n code words, each batch containing a synchronisation code word and (n=1) address/message code words, comprises timing means operable in a carrier-off mode for switching on a receiver section of the pager for a duration corresponding to m bits at intervals corresponding to (n+1) code words; shift register means for storing data received during the m bit periods, the shift register having m stages and the data being concatenated onto the data received in the previous interval; and preamble and synchronisation code word detecting means coupled to the shift register means, the detecting means producing different output signals in response to a preamble bit pattern being detected or a synchronisation code word being detected. The output signal produced in response to the detection of the preamble is used to set the timing means to wait for synchronisation code word detection. The other output signal, produced in response to the detection of the synchronisation code word, is used to reset the timing means so that the pager operates in a data receive mode.

The pager decoding system in accordance with the present invention enables a transmitted signal to be detected and properly synchronised if there has been a loss of signal due to a deep fade as well as due to the termination of a previous transmission and the commencement of a new one. Additionally the system is inherently capable of greater battery economy in the carrier-off mode because it is turned-on every (n+1) code words rather than every n code words as is done in known POCSAG pagers.

The pager decoding system in accordance with the present invention may further comprise means for detecting the absence of a synchronisation code word when the pager is operating in its data receive mode, said means producing an output signal in response to detecting the absence of the synchronisation code word such that the pager operates in a fade recovery mode, which output signal is applied to the timing means such that said timing means enables data input to the shift register for at least m+2 bit periods and activates the preamble and synchronisation code word detecting means for the (m−1)th, mth and (m+1)th bit periods in every nth code word, whereby in response to detecting preamble or a synchronisation code word, the timing means is reset so that the pager operates in a data receiver mode, but if no synchronising signal is detected after a predetermined number of batches, then the pager adopts a carrier-off mode in which data is switched into the shift register means every (n+1) code words.

By being able to examine the input signal in the fade recovery mode for a predetermined number of batches, the pager decoding system is capable of recovering synchronisation in the event of a fade lasting several batches whereas the cited prior art system reverts to a carrier-off mode very quickly, which means that batch synchronisation is not achieved until a new transmission is made, i.e. until preamble is transmitted.

The present invention will now be described, by way of example, with reference to FIGS. 1-5 of the accompanying drawings, wherein:

FIGS. 4A-4D are waveform diagrams which illustrate the change from the data receive mode to the fade recovery mode, and FIGS. 5A-5E are waveform diagrams which illustrate the operation of the decoding system in its carrier-off mode.

DETAILED DESCRIPTION OF THE PREFERRED EMBODIMENT

Figure 1:
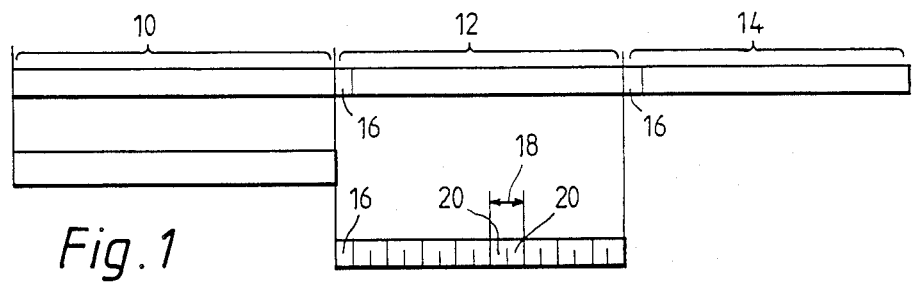
FIG. 1 is a diagram showing the POCSAG transmission signal format.
Figure 2:
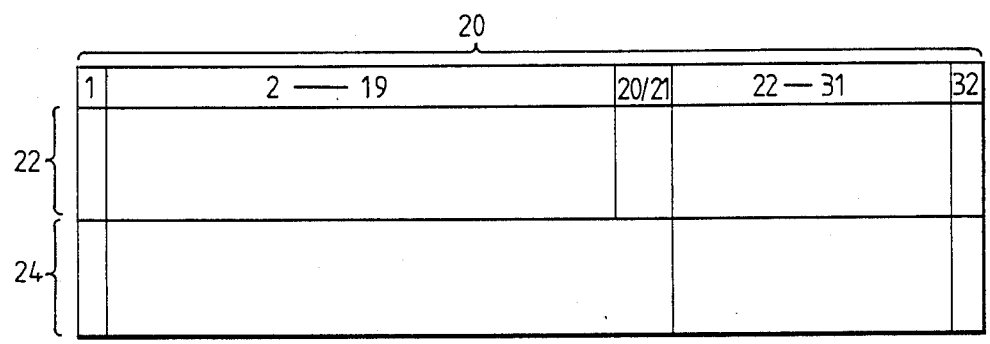
FIG. 2 is a diagram showing the POCSAG address code word and message code word formats.

The paging receiver 100 comprises a receiver section 102 which is turned on and off by a receiver power control circuit 104, which is in turn controlled by a timer control circuit 106. A 32-stage shift register 108 is coupled to the receiver section 102. Outputs of each of the stages of the shift register 108 are coupled to an address detector 110 and to a preamble and synchronisation detector 112. In the interests of clarity, not all 32 outputs have been shown. The detector 112 has two outputs 114, 116 on which appear respectively output signals indicating that the preamble bit pattern and synchronisation bit pattern have been detected. These outputs 114, 116 are connected to a preamble and synchronisation pulse generator 118. In response to an output signal on the output 114, the generator 118 produces a pulse on a line 120 and in a similar manner an output signal on the output 116 causes a pulse to be produced on the line 122. The lines 120 and 122 are coupled to the timer control circuit 106. A frame number store 124, which hols the number of the frame in which the address code word is transmitted, is also coupled to the timer control circuit 106.

An address store 128, which stores the addresses allocated to the paging receiver 100, is coupled to the address detector 110. An output of the detector 110 is connected to an alert control circuit 130 which controls the energisation of an acoustic transducer 132. The timing control circuit 106 has an output connected to the address detector 110.

Assuming that the paging receiver 100 is already in bit and batch synchronisation, then the timing control circuit 106 causes the power control circuit 104 to energise the receiver section 102 at the synchronisation code word interval and the allocated frame interval in each batch. If an address allocated to the paging receiver 100 is detected, then the alert control circuit 130 causes the transducer 132 to be energised.

The operation of the decoding system in the fade recovery and carrier-off modes will now be described with reference to FIGS. 4A–4D, and FIGS. 5A–5E.

In FIGS. 4A–4D, the left-hand part refers to the data receive mode and the right-hand part refers to the fade recovery mode wherein the data is lost to the receiver, as shown in broken lines in waveform of FIG. 4A.

Figure 3:
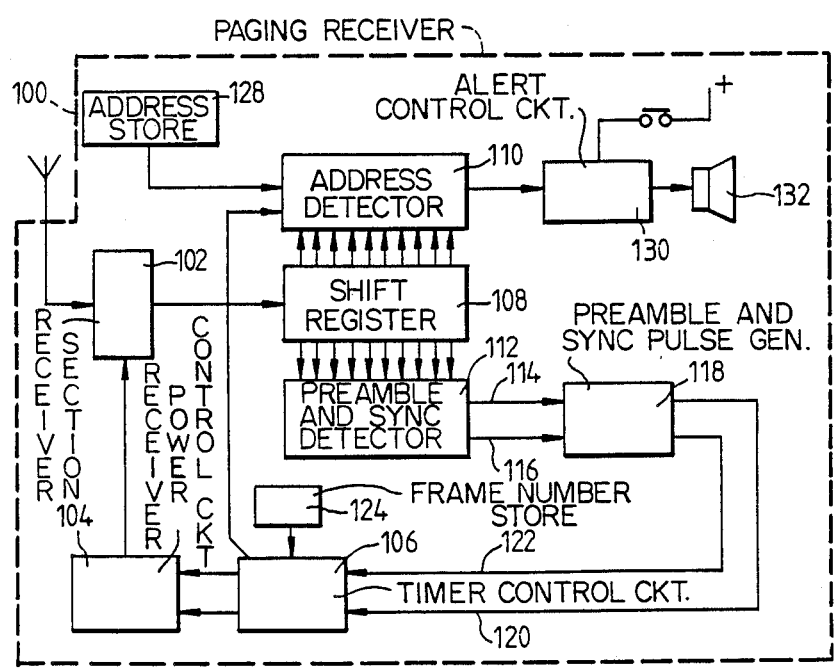
FIG. 3 is a block schematic circuit diagram of a paging receiver and shows those parts which are necessary for the understanding of the pager decoding system in accordance with the invention.

In the data receive mode the preamble 10 (not shown in FIGS. 4A–4D) and the synchronisation code word 16 have already been detected, to that the receiver is both bit synchronised and batch synchronised. This is shown in the waveform of FIG. 4B wherein the receiver section 102 (FIG. 3) is switched-on or powered-up at the intervals 40 to receive the synchronising code word 16.

The pulse generator 118 produces synchronising pulses 42, the waveform of FIG. 4C, at times corresponding to the end of the parity bit, bit 32, of the synchronisation code words 16. These pulses, when generated, are used by the timing control circuit 106 to control the switching of the receiver 102 by means of signals to the receiver power control circuit 104 for the detection of address code words and to predict the time occurrence of the synchronisation code word at the start of the subsequent batch by means of a counter within the timing control circuit 106, which counter produces an output every seventeenth code word in anticipation of the receipt of the subsequent synchronisation code word.

Once the synchronisation code word has been detected, the timing control circuit 106 switches off or powers down the receiver section 102 by means of the receiver power control circuit 104 until the frame 18 (FIG. 1) to which its address code words are assigned, at which time the timing control circuit 106 switches on the receiver section 102 for the duration of that particular frame. This is denoted by the pulses 44 in FIG. 4B. At the end of the address frame, the timing control circuit 106 switches off the receiver section 102 again until the start of the subsequent synchronisation code word time slot, at which time the receiver section 102 is again switched on in order to repeat the process.

When data is lost or corrupted beyond detection, e.g. due to a fade in the received signal, as shown in broken lines in waveform FIG. 4A, the synchronisation code word cannot be detected when the receiver section 102 is switched on for the duration of the synchronisation code word time slot and no synchronising pulse is produced by the pulse generator 118. Upon failing to detect the first of these synchronisation pulses, denoted by arrow 46 in the timing diagram of FIG. 4D, the timing control circuit 106 switches the pager from the data receive mode 48 to the fade recovery mode 50. As no synchronising pulse 42 is generated, the timing control circuit 106 inhibits the receiver power control circuit 104 so that the receiver section 102 is not switched on at the assigned address frame time slot. The timing control circuit 106 continues to run and causes the receiver section 102 to be switched on during every seventeenth code word time slot in order to attempt to retain synchronisation should the pager be in a deep fade such that data reception would be maintained when the fade ends. In the face recovery mode it is not possible to determine whether true data is being received and hence whether bit synchronisation is being maintained. Thus in order to account for any timing errors introduced, the decoding system inspects the incoming data for the preamble bit pattern as well as for the synchronisation code word just in case the loss of data is due to a cessation of transmission of data, at the 31st, 32nd and 33rd bit positions of every seventeenth code word. The fade recovery mode is maintained for a predetermined number of batches (e.g. 30), whereupon the timer control circuit 106 switches the decoding system to the carrier-off mode. The exact number of batches during which the fade recovery mode is maintained is a function of the stabilities of the transmitter and receiver data frequency crystal oscillators and of the characteristics of the bit synchronisation technique employed. In order to detect the synchronisation code word at the 31st bit position, the receiver section 102 is turned on one bit earlier than is customary. In addition, to detect the synchronisation code word at the 33rd bit position, the receiver section 102 is turned off one bit later than is customary.

In the carrier-off mode the paging receiver section 102 is switched on and the input signal is clocked into the 32-stage shift register 108 for a 32-bit period and then the receiver section 102 is switched off. Outputs of the shift register stages are coupled in parallel to the preamble and synchronisation signal detector 112. Assuming that the preamble bit pattern or the synchronisation code word is not stored in the shift register 108, then precisely eighteen code words later the receiver section 102 is switched on and another thirty-two bits are stored by being concatenated onto the already stored data. As each bit is clocked in, a check is made by the synchronisation and preamble detector 112 to determine whether 32 bits of the preamble pattern or the synchronisation code word are present in the shift register 108. If preamble is detected, which is indicative that a new transmission is under way, then the synchronisation pulse generator 118 produces an output on the line 122 coupled to the timing control circuit 106 which maintains the receiver section 102 on until the synchronisation code word is detected, up to a maximum duration of eighteen code words if a synchronisation code word is not detected. If the synchronisation code word is detected, the pulse generator 118 produces a synchronising pulse which causes the timer control circuit 106 to switch the decoding circuit into the data receiver mode.

If the loss of signal is due to a long fade, then the first information detected will be the synchronisation word. Thus by switching on the receiver section 102 every eighteen code words, the detector is able to comb through all the relative bit positions in a batch in seventeen batch durations. By using the shift register 108 in the manner described, it is possible to pick-up the synchronisation code word in spite of the fact that the switching on and switching off of the receiver section 102 are not synchronised to the incoming data. How this is done will be described with reference to FIG. 5.

The waveform of FIG. 5A illustrates the incoming data with a synchronisation code word 16 every seventeen word words as is usual with the POCSAG code structure. FIG. 5B illustrates the switching on of the receiver 102 every eighteen code words. FIG. 5C illustrates the blocks of 32 bits of data being read into the shift register 114. The left-hand block received first comprises 32 bits, some of which are the first part X of a synchronisation code word. The next time the receiver section 102 is turned on, the first group of data to be read in is the second part Y of the subsequent synchronisation code word. At the instant that the concatenated parts X and Y are configured in the shift register to form a complete synchronisation code word, see FIG. 5D, the synchronisation signal detector 112 recognises that the shift register 108 contains the synchronisation code word and causes the synchronising pulse generator 118 to produce a synchronisation pulse, FIG. 5E, which is used by the timing control circuit 106 to reset the receiver power control circuit 104 so that the pager operates in a data receive mode as before.

Although the decoding system in accordance with the present invention has been described with particular reference to the POCSAG format, it is adaptable to other formats having a fixed-length regular batch structure, each batch comprising a synchronisation code word whose position in a batch is fixed relative to address and/or message code words, and multiples of such batches being concatenated with the preceding preamble to form a transmitted signal.

We claim:

1. A pager decoding system for decoding information transmitted in a binary coded signal format involving transmission of a preamble signal followed immediately by transmission of a sequence of batches of code words, wherein a code word consists of m bits, and a batch consists of n code words, the first code word of a batch being a given synchronization code word, said preamble comprising a repeating pattern at least m (n+1) bits in length, and said preamble being repeated only after transmission of at least one said batch of code words, comprising:
   means for receiving transmitted binary coded information, including a pager receiver section,
   timing means for switching said receiver section on for a duration corresponding to m bits, at intervals corresponding to (n+1) code words,
   shift register means, coupled to said receiver section output, for storing data received during m consecutive bit periods, said shift register having an m stage parallel output, data stored in said shift register being concatenated onto data received in a previous interval, and
   means for detecting presence of a preamble pattern at said register output, and in response to detection of said pattern setting said timing means to maintain said receiver section switched on until detecting of a synchronization code word,
   means for detecting presence of a synchronization code word at said register output, and in response to detection of a synchronization code word to reset said timing means to an off state for a predetermined time period, and then to switch said receiver section on for a second predetermined time period.

2. A pager decoding system for decoding information transmitted in a binary coded signal format involving transmission of a preamble signal followed immediately by transmission of a sequence of batches of code words, wherein a code word consists of m bits, and a batch consists of n code words, the first code word of a batch being a given synchronization code word, said preamble comprising a repeating pattern at least m (n+1) bits in length, and said preamble being repeated only after transmission of at least one said batch of code words, comprising:
   a receiver section having a data output,
   battery-saving means for turning said receiver section off for a predetermined period of time, and then turning said receiver section on, said battery-saving means having at least a carrier-off mode of operation, and a data receive mode of operation in which said receiver section is turned on once during each batch at a given time after the synchronization code word, for a time at least equal to the length of one said code word, and is then turned off, and
   detector means for detecting a preamble signal in said data output, and for controlling said battery saving means responsive to detection of the preamble signal,
   characterized in that said detector means includes means, operable during said carrier-off mode, for producing a first output signal responsive to detection of a preamble bit pattern, and for production of a second output signal different from said first output signal responsive to detection of a synchronization code word, whether or not said preamble bit pattern has been detected,
   upon receipt of said first output signal, said means for controlling causing said receiver section to be kept on until receipt of said second signal; and resetting said battery saving means to operate in said data receive mode in response to receipt of said second output signal.

3. A pager as claimed in claim 2, further operable in a fade recovery mode, comprising means for producing a third output signal in response to detecting the absence of a synchronization code word at the beginning of a batch, and means controlling said battery-saving means to maintain said receiver section turned on for a duration of at least m+2 bit periods, and activating said detector means for the (m−1)th, mth and (m+1)th bit periods in every nth code word; and said pager further comprising means, responsive to the absence of receipt of one said second output signal for a predetermined successive number of batches, for resetting said battery saving means to operate in the carrier-off mode.

* * * * *